US011430269B1

(12) United States Patent
Szabo et al.

(10) Patent No.: US 11,430,269 B1
(45) Date of Patent: Aug. 30, 2022

(54) VALET TICKET GENERATION SYSTEM

(71) Applicant: REEF CDN SOFTWARE HOLDCO ULC, Vancouver (CA)

(72) Inventors: Adam Szabo, Brampton (CA); Yeheskel Orrin Bocher, Toronto (CA); David Lamperth, Pannonhalma (HU)

(73) Assignee: REEF CDN SOFTWARE HOLDCO ULC

( * ) Notice: Subject to any disclaimer, the term of this patent is extended or adjusted under 35 U.S.C. 154(b) by 364 days.

(21) Appl. No.: 16/400,518

(22) Filed: May 1, 2019

(51) Int. Cl.
| | | |
|---|---|---|
| *G06Q 30/00* | (2012.01) | |
| *G07B 5/04* | (2006.01) | |
| *G06Q 10/08* | (2012.01) | |
| *G06Q 30/06* | (2012.01) | |

(52) U.S. Cl.
CPC ............. *G07B 5/04* (2013.01); *G06Q 10/087* (2013.01); *G06Q 30/0635* (2013.01)

(58) Field of Classification Search
CPC .................................. G06Q 30/00; G07B 5/04
See application file for complete search history.

(56) References Cited

U.S. PATENT DOCUMENTS

| | | | | | |
|---|---|---|---|---|---|
| 3,775,593 | A | * | 11/1973 | Gieringer ............... | G07F 17/145 235/378 |
| 2010/0191585 | A1 | * | 7/2010 | Smith ................... | B60L 53/665 705/13 |
| 2012/0047001 | A1 | * | 2/2012 | Chagnon ................ | G06Q 10/08 705/13 |
| 2012/0111937 | A1 | * | 5/2012 | Rogich ................... | G06Q 10/10 235/380 |
| 2012/0232965 | A1 | * | 9/2012 | Rodriguez ............. | G07B 15/02 705/13 |
| 2012/0262279 | A1 | * | 10/2012 | Greene ..................... | G07B 1/00 340/10.4 |
| 2014/0066110 | A1 | * | 3/2014 | Lovegreen ............ | G07F 17/242 455/466 |

(Continued)

OTHER PUBLICATIONS 0-valet1, https://web.archive.org/web/20190124033238/https://www.o-valet.com/, webpage from Wayback machine, dated Jan. 24, 2019. (Year: 2019).*

(Continued)

*Primary Examiner* — Mark A Fadok
(74) *Attorney, Agent, or Firm* — Sunstein LLP

(57) ABSTRACT

A valet ticket generation system that is operable to provide contribution to the operation of a valet service for a valet operator. The present invention includes a software configured to provide generation of valet tickets of at least two types wherein the two types of valet tickets are cross-referenced and operationally linked utilizing a first ticket identification number and a second ticket identification number. The second ticket identification number serves as a pin code for the first ticket identification number and is required to validate the first ticket identification number. The present invention further includes the providing of a unique website that is specific to the valet operator or the property on which the valet service is being provided. Further included is the ability to generate valet tickets on demand or have the tickets printed for inventory. Additional services are also facilitated by the system of the present invention.

15 Claims, 2 Drawing Sheets

(56) References Cited

U.S. PATENT DOCUMENTS

| | | | | |
|---|---|---|---|---|
| 2016/0071373 A1* | 3/2016 | Anderson | ............ | G07F 17/3239 |
| | | | | 463/25 |
| 2016/0078689 A1* | 3/2016 | Cheng | .................... | G07B 15/02 |
| | | | | 705/13 |
| 2016/0133133 A1* | 5/2016 | Triplett | .................... | H04W 4/02 |
| | | | | 340/932.2 |
| 2016/0163121 A1* | 6/2016 | Martin | .................... | G06Q 10/02 |
| | | | | 705/13 |
| 2019/0035274 A1* | 1/2019 | Sabagh | .................. | G08G 1/123 |

OTHER PUBLICATIONS

O-valet2, https://web.archive.org/web/20190301181232/https://get.o-valet.com/valet-parking-software/, webpage from Wayback machine, dated Mar. 11, 2019. (Year: 2019).*

CVPS, https://web.archive.org/web/20180625135525/http://www.cvps.solutions/valet-parking.php, webpage from Wayback machine, dated Jun. 25, 2018. (Year: 2018).*

Valettickets.com, "Valet ticket—Custom valet parking tickets", Valettickets.com, dated Aug. 22, 2011. (Year: 2011).*

* cited by examiner

VALET TICKET GENERATION SYSTEM

FIELD OF THE INVENTION

The present invention relates generally to vehicle valet operations, more specifically but not by of limitation, a valet ticket generation system that issues a randomly generated pin number for each ticket wherein the pin number provides security during the vehicle request process to ensure the correct vehicle is returned to the proper owner.

BACKGROUND

As is known in the art, valet operators provide parking services for establishments such as but not limited to hotels and restaurants. Either due to parking restrictions or to provide an enhanced customer service experience, guests of the establishment will provide their vehicle to an attendant for parking and will engage the attendant for subsequent retrieval thereof. Upon leaving the vehicle with the attendant, the vehicle owner will receive a paper ticket that most often includes a number on the ticket wherein a corresponding portion of the ticket having the same number is retained by the valet operator and secured to the key ring of the vehicle. The valet operator will typically order conventional valet tickets in batches of tens of thousands that contain an identification number that is typically at least six digits in length. This conventional format can be cumbersome for a guest to manage when utilizing the number for data entry into a system that facilitates the retrieval of the vehicle.

Conventional valet tickets are not customizable wherein other characters can be added so as to change the formatting of the ticket identification number. By way of example, a hotel may prefer to have its acronym or abbreviation as part of the ticket identification number for branding or more specific identity purposes. Furthermore, conventional valet tickets only have the one number and there is no additional identifier and as such lack options when determining vehicle ownership and other ticket generation advantages.

Accordingly, there is a need for a valet ticket generation system that provides valet ticket generation and a system for use thereof wherein the system includes features such as but not limited to randomly generated pin numbers and unique site url's to facilitate engagement and use of the valet operator's service.

SUMMARY OF THE INVENTION

It is the object of the present invention to provide a valet ticket generation system that is operable to provide valet tickets for a valet operation wherein the valet tickets produced by the system of the present invention include a simple value ticket identifier.

Another object of the present invention is to provide a valet ticket system that is operable to provide ticket generation and facilitate operation of a portion of a vehicle valet service wherein the valet ticket further includes a randomly generated pin number in addition to the simple value ticket identifier.

A further object of the present invention is to provide a valet ticket generation system that is operable to provide valet tickets for a valet operation wherein the simple value ticket identifier further includes characters such as but not limited to acronyms or abbreviations of the facility for which they are being utilized.

Still another object of the present invention is to provide a valet ticket system that is operable to provide ticket generation and facilitate operation of a portion of a vehicle valet service wherein the operator of the present invention provides establishment of a unique url for use by the valet guest in order to retrieve their vehicle.

An additional object of the present invention is to provide a valet ticket generation system that is operable to provide valet tickets for a valet operation wherein the valet tickets of the present invention are provided in a first media or a second media.

Yet a further object of the present invention is to provide a valet ticket system that is operable to provide ticket generation and facilitate operation of a portion of a vehicle valet service that further provides an option to utilize SMS messaging to facilitate a portion of the process of the present invention.

Another object of the present invention is to provide a valet ticket generation system that is operable to provide valet tickets for a valet operation that further includes the utilization of a key ticket in addition to a client issued ticket.

An alternate object of the present invention is to provide a valet ticket system that is operable to provide ticket generation and facilitate operation of a portion of a vehicle valet service that further includes a link ticket or an established link intermediate the customer ticket and the key ticket.

Still a further object of the present invention is to provide a valet ticket generation system that is operable to provide valet tickets for a valet operation that further includes the utilization of the pin number in the vehicle request process in order to validate correct vehicle ownership and proper vehicle return.

An additional object of the present invention is to provide a valet ticket system that is operable to provide ticket generation and facilitate operation of a portion of a vehicle valet service wherein in the present invention valet tickets can be pre-generated or generated on demand.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
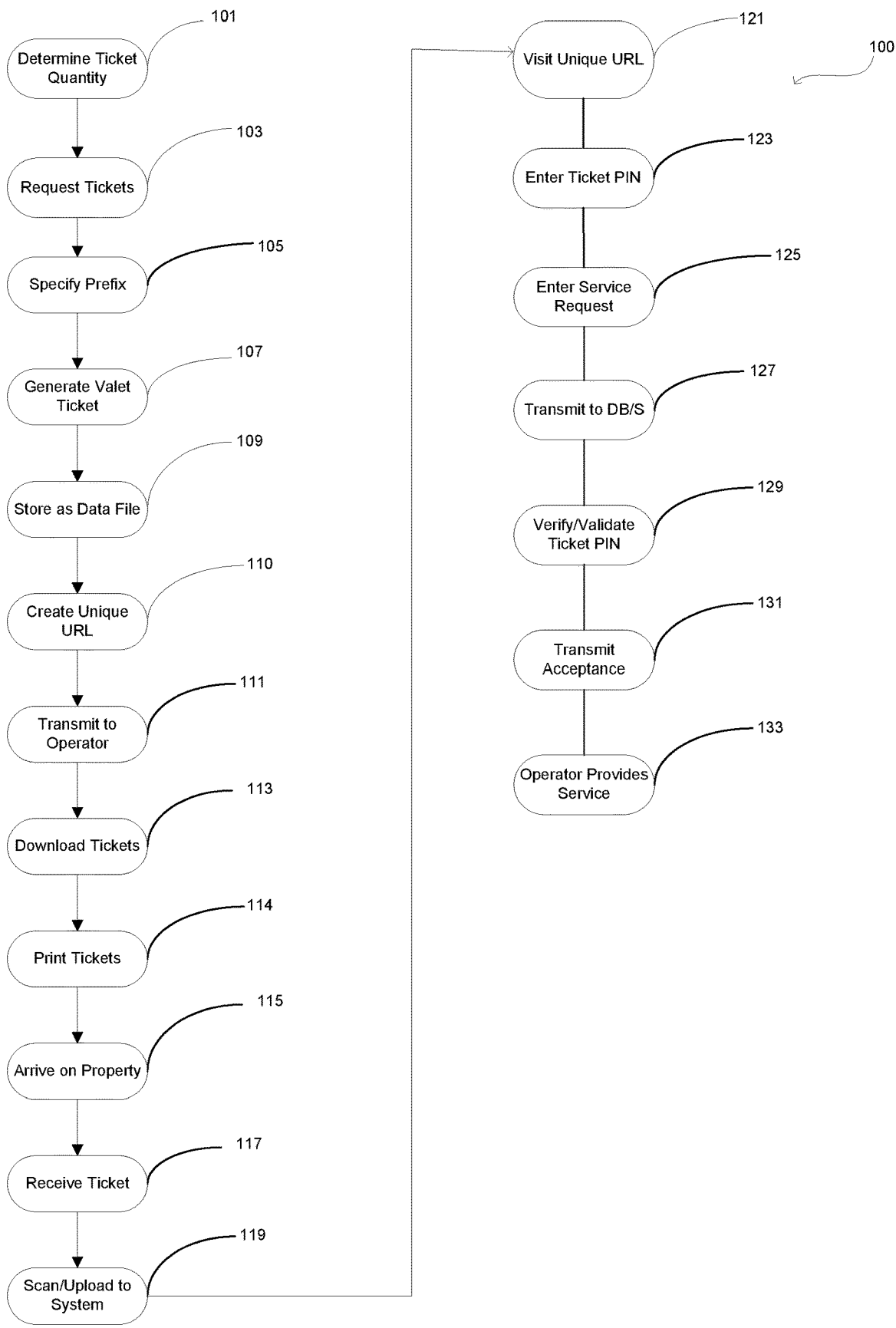
FIG. 1 is a process flow diagram of the present invention for a paper ticket.

Referring now to the drawings submitted herewith, wherein various elements depicted therein are not necessarily drawn to scale and wherein through the views and figures like elements are referenced with identical reference numerals, there is illustrated a valet ticket generation system 100 constructed according to the principles of the present invention.

An embodiment of the present invention is discussed herein with reference to the figures submitted herewith. Those skilled in the art will understand that the detailed description herein with respect to these figures is for explanatory purposes and that it is contemplated within the scope of the present invention that alternative embodiments are plausible. By way of example but not by way of limitation, those having skill in the art in light of the present teachings of the present invention will recognize a plurality of alternate and suitable approaches dependent upon the needs of the particular application to implement the functionality of any given detail described herein, beyond that of the particular implementation choices in the embodiment described herein. Various modifications and embodiments are within the scope of the present invention.

It is to be further understood that the present invention is not limited to the particular methodology, materials, uses and applications described herein, as these may vary. Furthermore, it is also to be understood that the terminology used herein is used for the purpose of describing particular embodiments only, and is not intended to limit the scope of the present invention. It must be noted that as used herein and in the claims, the singular forms "a", "an" and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

References to "one embodiment", "an embodiment", "exemplary embodiments", and the like may indicate that the embodiment(s) of the invention so described may include a particular feature, structure or characteristic, but not every embodiment necessarily includes the particular feature, structure or characteristic.

Figure 2:
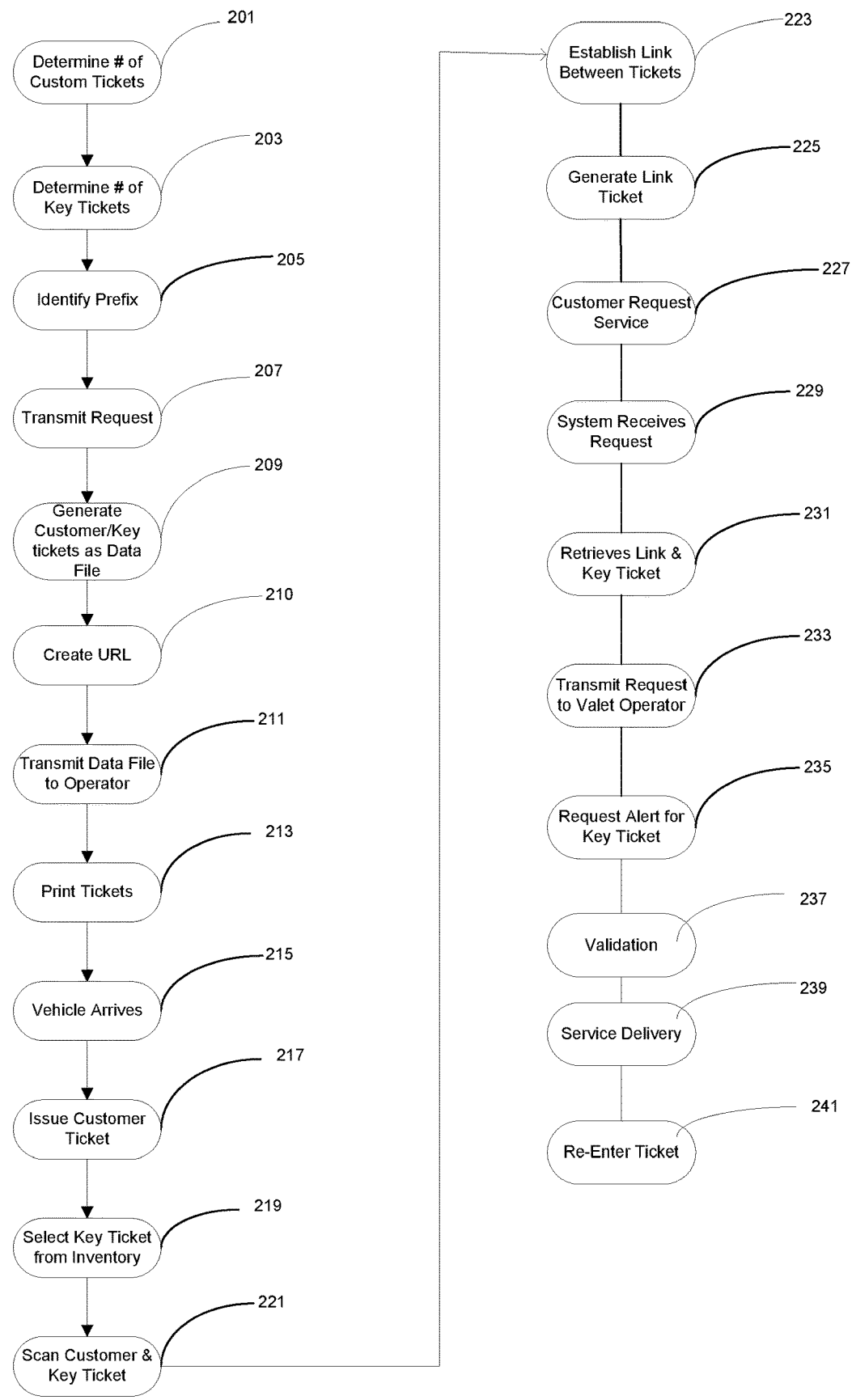
FIG. 2 is a process flow diagram of the present invention for a plastic ticket.

Now referring in particular to the Figures submitted herewith, the valet ticket generation system 100 includes two processes diagrammed herein in FIGS. 1 and 2 wherein the processes diagrammed therein are for the alternate media type of the valet ticket of the present invention. It is contemplated within the scope of the present invention that the valet ticket generation system 100 utilize either a paper valet ticket or a plastic valet ticket wherein the process for utilization thereof is different. Referring to FIG. 1, the process for utilization of the paper valet ticket is diagrammed therein. In step 101, the valet operator will determine the quantity of tickets required to support their valet operation for a desired period of time. Step 103, the valet operator will initiate a request to the operator of the valet ticket generation system 100 for the desired quantity of tickets. In step 105, the valet operator will specify any unique prefix that is to be utilized as part of the first ticket identification number that is imprinted on the valet ticket. It is contemplated within the scope of the present invention that the unique prefix could be but is not limited to an abbreviation or acronym of the facility in which the valet tickets will be utilized. Step 107, the operator of the valet ticket generation system 100 will utilize the software of the present invention to generate the valet tickets requested. During generation of the valet tickets each valet ticket is assigned and has imprinted thereon a first ticket identification number and a second ticket identification number. The first ticket identification number comprises of a unique prefix, if specified and three characters. It is contemplated within the scope of the present invention that the first ticket identification number by way of example but not limitation could consist of numbers, alphanumeric characters or special characters. Furthermore the first identification number could be as few as one character or higher than three. It should be understood within the scope of the present invention that the term, numbers, herein could mean characters such as but not limited to numbers, alphanumeric characters and special characters. The second ticket identification number is a randomly generated pin number that is three digits. While a three digit pin is preferred in the scope of the present invention, it is contemplated within the scope of the present invention that the pin number could be more or less than three digits. It is further contemplated within the scope of the present invention that the second ticket identification number could be generated via a non-random process such as the utilization of a phone number or license plate number. Utilization of the first ticket identification number and second ticket identification number allows for a smaller range for the first ticket identification number due to a specific pin number associated therewith that serves as the second ticket identification number.

In step 109, the generated tickets are stored as a data file. While no particular data file type is required, it is contemplated within the preferred embodiment of the present invention that an Excel data file type be utilized. Step 110, the operator of the valet ticket generation system 100 will create a unique url website domain for the requestor of the valet tickets. The unique website domain is provided for the valet operator and the customers thereof to access the software of the present invention and provide specific identification of the valet operator and/or the property at which the vehicle has been parked. It should be understood by those skilled in the art that the unique website domain is created utilizing conventional website publishing techniques. In step 111, the operator of the valet ticket generation system 100 transmits the data file containing the valet ticket information to the valet operator utilizing suitable data file transmission techniques. Step 113, the valet operator will retrieve the transmitted data file of valet tickets. Step 114, the valet operator will either print the batch of valet tickets or print the tickets as needed on demand utilizing suitable printing techniques. In step 115, a valet customer arrives on-site in a vehicle that needs to be parked by the valet operator. Step 117, the valet operator will provide a portion of the valet ticket to the customer. The paper valet ticket of the present invention includes a first portion, a second portion and a third portion that are releasably secured. The first portion includes the first ticket identification number and is separated to be secured to the key ring of the keys for the vehicle. The second portion of the valet ticket includes the first ticket identification number and is configured to be separated and placed on the dashboard of the vehicle. The third portion of the valet ticket is provided to the client and includes the first ticket identification number and the second ticket identification number, which is the randomly generated pin number. The first portion, second portion and third portion all further include additional tracking indicia and/or barcoding.

In step 119, at least one of the portions of the valet ticket is scanned at the time of issuance to the client and uploaded to the database server of the valet ticket generation system 100. Step 121, the customer will visit the unique website created for the valet operator when the time has arrived to request a service regarding the vehicle. In step 123, the customer will enter the first ticket identification number and the pin number. Step 125, the customer will specify the service required for the vehicle. Within the scope of the present invention the customer can utilize the unique website interface to order additional services in addition to retrieval of the vehicle. By way of example but not limitation the services that can be ordered by the customer are as follows: delivery of the vehicle, delivery of the vehicle at a future date or time, service for the vehicle such as but not limited to cleaning thereof, requesting an item disposed in the vehicle to be delivered to the customer and requesting an item to be delivered and placed in the vehicle such as but not limited to groceries. In step 127, the ticket information is transmitted to database server of the present invention. Step 129, the software of the present invention will validate the first ticket identification number and the second ticket identification number or pin. The pin acts as a password or additional identifier to ensure security. Step 131, the valet operator will receive acceptance of the ticket data entry and details about the service requested. In step 133, the valet operator will provide the requested service wherein exemplary service options have been listed herein above.

Referring now in particular to FIG. 2 submitted herewith, the valet ticket generation system 100 includes an alternate process for the second media of valet ticket wherein the preferred media for the second ticket type is plastic. It should be recognized by those skilled in the art that the second ticket media type could be manufactured from alternate materials instead of plastic having similar characteristics thereto. In step 201, the valet operator will determine a quantity of customer tickets required to support their valet operations. Step 203, the valet operator will further determine the number of key tickets required to support their operation. The key tickets while in a preferred embodiment are configured to be releasably secured to a key ring, it is contemplated within the scope of the present invention that the key ticket may be configured to be placed in alternate positions or secured to alternate objects. It should be understood within the scope of the present invention that the quantity of key tickets will at least be the same as the quantity of customer tickets but could be any multiple thereof. In step 205, the valet operator will identify a prefix that is to be incorporated into the first ticket identification number. Step 207, the valet operator will transmit the request for the customer tickets and key tickets to the operator of the valet ticket generation system 100.

In step 209, the operator of the valet ticket generation system 100 will generate the customer and key tickets wherein the operator utilizes an algorithm that provides a unique randomly generated pin number for each customer ticket. The operator generates the customer ticket and the key ticket in the form of an electronic data file that is suitable for transmission to the valet operator. Step 210, upon request the operator of the valet ticket generation system 100 will create a unique website that is specific to the valet operator or the site at which the valet operator is providing the valet service wherein the website is utilized by clients of the valet operator. In step 211, the operator of the valet ticket generation system 100 will transmit the ticket data file utilizing suitable techniques. Step 213, the valet operator will print either for inventory or on demand the customer tickets and the key tickets wherein the printed media is plastic. In step 215, a customer arrives at the valet operator location and requests valet service. Step 217, the valet operator will issue the customer a customer ticket. In step 219, the valet operator will select a key ticket from an inventory thereof. Step 221 the customer ticket and the key ticket are scanned using the conventional barcodes imprinted thereon. The software of the present invention establishes an operational link intermediate the scanned customer ticket and key ticket. An operable link is established intermediate the scanned customer ticket and the scanned key ticket in step 223. In step 225, the operable link intermediate the customer ticket and key ticket is physically represented by the creation of a link ticket and is further stored in the database server of the present invention transmitted thereto utilizing suitable techniques.

In step 227, the customer of the valet operator will request a service via the unique website or other conventional communication methods such as but not limited to phone or text message. The service request will require the entry of the first ticket identification number and the second ticket identification number. Step 229, the operator of the software of the valet ticket generation system 100 will receive the request for service. In step 231, the operator will retrieve the link ticket and key ticket associated with the customer ticket number and validate the association thereof. In step 233, the operator of the valet ticket generation system 100 will transmit the validated information to the valet operator. Step 235, an alert containing the key ticket information is provided to the valet operator. In step 237, the valet operator will provide validation of the key ticket. Step 239, the valet operator will perform the requested service. As described previously herein, the service can include but is not limited to delivery of the vehicle. Step 241, if the service delivered is the delivery of the vehicle at the time of the customer leaving the facility, the valet operator will retrieve the customer ticket and any other associated tickets such as but not limited to key tickets and re-enter into the software of the valet ticket generation system 100 and make available for re-use thereof.

It is further contemplated within the scope of the present invention that a portion of the process thereof could be facilitated utilizing SMS text messaging. An exemplary representation of the portion of the process flow would be comprised of the customer providing a cellular phone number upon arrival at the facility to the valet operator. The valet operator would generate a customer ticket wherein the generation of the customer ticket includes the first ticket identification number and the second ticket identification number. Subsequent the generation of the customer ticket the software of the valet ticket generation system 100 transmits a SMS text message to the cellular phone number of the customer wherein the SMS text message includes a structured url link wherein the url link includes the first ticket identification number and second ticket identification number and will provide a direct link to a unique website and automated data entry of the aforementioned for verification and allowance of a service request.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding description is, therefore, not intended to be limited to the specific forms set forth herein, but on the contrary, it is intended to cover such alternatives, modifications, and equivalents, as can be reasonably included within the spirit and scope of the invention.

What is claimed is:

1. A method for generating valet tickets for a parking operation, the method comprising:

creating a plurality of valet tickets, wherein each valet ticket comprises a customer ticket portion, a key ticket portion, and a link ticket portion; wherein each of the valet tickets includes a first ticket identification number and a second ticket identification number; and wherein the second ticket identification number is randomly generated;

storing said plurality of valet tickets in an electronic file on a database server;

upon request by a customer to store a vehicle, a valet operator issues one of the plurality of valet tickets for the customer, wherein for the issued valet ticket, the customer ticket portion and the key ticket portion include both the first ticket identification number and the second ticket identification number and the link ticket portion includes the first ticket identification number, but not the second ticket identification number;

storing the issued valet ticket in the electronic file in the database server;

providing the customer ticket portion to the customer;

retaining, by the valet operator, the key ticket portion;

storing the vehicle for the customer with the link ticket portion;

when the customer desires the valet operator to perform a service in connection with the vehicle, electronically inputting by the customer, the first identification number and the second identification number associated with the customer's valet ticket, verifying that the first identification number and the second identification number provided by the customer match the first identification number and the second identification number stored in the electronic file on the database server;

if the entered first and second identification codes are verified, informing the valet operator of the service requested; and performing, by the valet operator, the service.

2. The method for generating valet tickets as recited in claim 1, further comprising a step of creating a unique website, wherein the unique website is specific to the valet operator or a property on which the valet operator is providing a valet service, and wherein the customer electronically enters the first identification number and the second identification number via the unique website to request the service.

3. The method for generating valet tickets as recited in claim 1, further including the step of scanning the valet ticket upon issuance to the customer, wherein the valet ticket is scanned into an operating system.

4. The method for generating valet tickets as recited in claim 1, wherein the service requested comprises retrieval of the vehicle.

5. The method for generating valet tickets as recited in claim 1, wherein the service requested comprises one or more of retrieval of an item from the vehicle, or delivery of an item to the vehicle.

6. The method for generating valet tickets as recited in claim 1 wherein a prefix is incorporated into the first ticket identification number.

7. The method for generating valet tickets as recited in claim 1, wherein the issued valet ticket is printed on paper.

8. A method for generating valet tickets for a parking operation, the method comprising:

storing in an electronic file on a database server a plurality of a customer tickets, each having a first customer ticket identification number and a second customer ticket identification number; wherein the second customer ticket identification number is randomly generated;

storing in the electronic file on the database server a plurality of key tickets, each having a first key ticket identification number and a second key ticket identification number; wherein the second key ticket identification number is randomly generated;

printing, for inventory, the plurality of customer tickets and the plurality of key tickets;

upon request by a customer to store a vehicle, selecting from inventory, by a valet operator, one of the plurality of customer tickets for the customer to retain and one of the plurality of key tickets for the valet operator to retain; wherein the selected customer ticket has a first customer ticket identification number and a second customer ticket identification which do not correspond to a first key ticket identification number and a second key ticket identification number of the selected key ticket;

generating a link ticket associating the selected customer ticket and the selected key ticket; wherein the link ticket is stored in the electronic file on the database server, providing the selected customer ticket to the customer;

retaining, by the valet operator, the selected key ticket;

storing the vehicle for the customer;

when the customer desires the valet operator to perform a service in connection with the vehicle, electronically inputting, by the customer, the first customer ticket identification number and the second customer ticket identification number of the selected customer ticket;

retrieving, from the electronic file on the database server, the link ticket associated with the selected customer ticket and validating the association of the selected customer ticket to the retrieved link ticket;

upon validation, determining from the retrieved link ticket the selected key ticket associated with the selected customer ticket, and providing to the valet operator the first key ticket identification number and the second key ticket identification number of the selected key ticket; and performing, by the valet operator, the service.

9. The method for generating valet tickets as recited in claim 8, further comprising a step of creating a unique website, wherein the unique website is specific to the valet operator or a property on which the valet operator is providing a valet service and wherein the customer electronically enters the first identification number and the second identification number of the selected customer ticket via the unique website to request the service.

10. The method for generating valet tickets as recited in claim 8, wherein the step of generating the link ticket includes scanning the selected customer ticket and the selected key ticket and establishing a link between the selected customer ticket and the selected key ticket.

11. The method for generating valet tickets as recited in claim 8, wherein the service requested comprises retrieval of the vehicle and return of the vehicle to the customer.

12. The method for generating valet tickets as recited in claim 8, wherein the service requested comprises one or more of retrieval of an item from the vehicle, or delivery of an item to the vehicle.

13. The method for generating valet tickets as recited in claim 8 wherein a prefix is incorporated into the first ticket identification number.

14. The method for generating valet tickets as recited in claim 8, wherein the plurality of customer tickets and the plurality of key tickets are printed on plastic.

15. The method for generating valet tickets as recited in claim 8 wherein the service requested comprises retrieval of the vehicle and return of the vehicle to the customer; and wherein the method further includes retrieving the selected customer ticket and the selected key ticket and placing them back in the inventory for re-use.

\* \* \* \* \*